US011763090B2

(12) United States Patent
Xie et al.

(10) Patent No.: US 11,763,090 B2
(45) Date of Patent: *Sep. 19, 2023

(54) PREDICTING USER INTENT FOR ONLINE SYSTEM ACTIONS THROUGH NATURAL LANGUAGE INFERENCE-BASED MACHINE LEARNING MODEL (71) Applicant: salesforce.com, inc., San Francisco, CA (US)

(72) Inventors: Tian Xie, Palo Alto, CA (US); Kazuma Hashimoto, Palo Alto, CA (US); Xinyi Yang, San Francisco, CA (US); Caiming Xiong, Menlo Park, CA (US)

(73) Assignee: Salesforce, Inc., San Francisco, CA (US)

(*) Notice: Subject to any disclaimer, the term of this patent is extended or adjusted under 35 U.S.C. 154(b) by 394 days.

This patent is subject to a terminal disclaimer.

(21) Appl. No.: 16/718,186

(22) Filed: Dec. 18, 2019

(65) Prior Publication Data

US 2021/0142103 A1 May 13, 2021

Related U.S. Application Data (60) Provisional application No. 62/933,899, filed on Nov. 11, 2019.

(51) Int. Cl.
G06F 40/00 (2020.01)
G06F 40/30 (2020.01)
(Continued)

(52) U.S. Cl.
CPC .......... G06F 40/30 (2020.01); G06F 18/2148 (2023.01); G06F 18/2413 (2023.01); G06F 40/216 (2020.01); G06N 5/04 (2013.01)

(58) Field of Classification Search
CPC .... G06K 9/627; G06K 9/6257; G06F 40/216; G06F 40/279; G06F 40/30; G06N 5/04; G06N 5/046; G06N 20/00
See application file for complete search history.

(56) References Cited

U.S. PATENT DOCUMENTS 9,633,004 B2 * 4/2017 Giuli ...................... G06F 3/167
10,916,241 B1 2/2021 Edwards et al.
(Continued)

OTHER PUBLICATIONS

Kitaev, N. et al., "Constituency Parsing with a Self-Attentive Encoder," arXiv: 1805.01052, May 2, 2018, pp. 1-12.
(Continued)

Primary Examiner — Nancy Bitar
Assistant Examiner — Xiao Liu
(74) Attorney, Agent, or Firm — Fenwick & West LLP (57) ABSTRACT An online system that allows users to interact with it using expressions in natural language form includes an intent inference module allowing it to infer an intent represented by a user expression. The intent inference module has a set of possible intents, along with a small set of example natural language expressions known to represent that intent. When a user interacts with the system using a natural language expression for which the intent is not already known, the intent inference module applies a natural language inference model to compute scores indicating whether the user expression textually entails the various example natural language expressions. Based on the scores, the intent inference module determines an intent that is most applicable for the expression. If an intent cannot be determined with sufficient confidence, the intent inference module may further attempt to determine whether the various example natural language expressions textually entail the user expression.

19 Claims, 4 Drawing Sheets (51) Int. Cl.
*G06F 40/216* (2020.01)
*G06N 5/04* (2023.01)
*G06F 18/2413* (2023.01)
*G06F 18/214* (2023.01)

(56) References Cited

U.S. PATENT DOCUMENTS

| | | |
|---|---|---|
| 2013/0103391 A1 | 4/2013 | Millmore et al. |
| 2013/0246050 A1 | 9/2013 | Yu et al. |
| 2014/0379615 A1* | 12/2014 | Brigham ............. G06N 3/126 706/11 |
| 2014/0380285 A1* | 12/2014 | Gabel ............... G06N 5/022 717/139 |
| 2018/0157641 A1 | 6/2018 | Byron et al. |
| 2018/0239837 A1* | 8/2018 | Wang ............. G06F 16/90335 |
| 2018/0285340 A1 | 10/2018 | Murphy et al. |
| 2018/0336050 A1 | 11/2018 | Mukherjee et al. |
| 2019/0019509 A1 | 1/2019 | Lee et al. |
| 2019/0027134 A1 | 1/2019 | Kakirwar et al. |
| 2019/0236204 A1* | 8/2019 | Canim ............... G10L 15/16 |
| 2020/0234084 A1 | 7/2020 | Seaton et al. |
| 2020/0302924 A1 | 9/2020 | Andreica et al. |
| 2020/0394360 A1 | 12/2020 | Dunn et al. |
| 2021/0027774 A1 | 1/2021 | Kessler et al. |
| 2021/0194971 A1 | 6/2021 | Thum et al. |
| 2021/0374353 A1* | 12/2021 | Zhang ............... G06F 40/30 |

OTHER PUBLICATIONS

Kitaev, N. et al., "Multilingual Constituency Parsing with Self-Attention and Pre-Training," arXiv: 1812.11760, Jun. 4, 2019, pp. 1-7.

Vaswani, A. et al., "Attention Is All You Need," 31st Conference on Neural Information Processing Systems (NIPS 2017), Dec. 2017, pp. 1-15.

United States Office Action, U.S. Appl. No. 16/680,323, dated Dec. 14, 2021, 17 pages.

United States Office Action, U.S. Appl. No. 16/680,323, dated Nov. 23, 2022, 26 pages.

United States Office Action, U.S. Appl. No. 16/680,323, dated Jul. 13, 2022, 25 pages.

* cited by examiner

PREDICTING USER INTENT FOR ONLINE SYSTEM ACTIONS THROUGH NATURAL LANGUAGE INFERENCE-BASED MACHINE LEARNING MODEL

RELATED APPLICATIONS

This application claims the benefit of Provisional Application No. 62/933,899, filed on Nov. 11, 2019, which is incorporated herein by reference.

FIELD OF ART

The concepts described herein relate to the field of machine learning, and more specifically, to the use of natural language inference to predict user intents embodied by their natural language expressions.

BACKGROUND

Natural language is an expressive and highly intuitive medium for users when interacting with electronic systems, freeing users from the need to learn complex user interfaces, to navigate multiple screens of data, and the like. However, the very expressivity and open nature of natural language poses a challenge to the electronic systems, which are then tasked with determining the meaning of the users' natural language expressions.

Some electronic systems allow users to interact with them using natural language expressions (e.g., via voice or textual input) such as queries or commands, responding to the users with actions appropriate for the users' expressions. Many such systems attempt to determine the general intent of a user—such as to change an email address, or to make a purchase—and use that intent to drive interactions with the user, such as presenting a user interface, or asking a further clarifying question, that is appropriate given the user's intent. Intent determination is a difficult problem, however. To address the complexity, machine learning may be employed, but traditional natural language model training typically requires large amounts of labeled training data, and the process of labeling by human experts is costly in terms of both time and money.

The figures depict embodiments for purposes of illustration only. One skilled in the art will readily recognize from the following description that alternative embodiments of the structures and methods illustrated herein may be employed without departing from the principles described herein.

DETAILED DESCRIPTION

A user of an online system may interact with the system using natural language expressions—free-form, natural language linguistic input, such as requests, queries, or commands—such as within an online conversation of the user with an AI assistant of the online system. The online system may then provide the user with additional options or otherwise react to the user expression based on an intent that the online system determines is represented by the expression. However, traditionally this requires an accurate model for predicting user intent, which requires relatively large amounts of labeled training data. Labeling such training data can be costly, in terms both of required time and monetary expense.

In order to minimize the need for such training data, the online system instead obtains a very small amount of labeled training data and uses natural language inference to reliably determine a user's intent via comparison of the user's natural language input with the labeled training data.

More specifically, the online system stores a set of possible intents, and for each intent, a small number (e.g., 5) of example natural language expressions that correspond to that intent. To determine the intent of a given user natural language expression, the online system provides the expression and each stored example expression to a natural language inference model, which outputs a score indicating the likelihood that the user expression semantically entails the stored example expression. If the scores indicate sufficient confidence, the online system selects the intent with the best scores (e.g., the intent having the highest score) as representing the user expression. If the scores score indicate insufficient confidence, new scores may be computed in reverse—i.e., to determine whether the stored example expression semantically entails the user expression—and an intent again selected if the new scores indicate sufficient confidence.

Based on the determined intent, the online system (e.g., its AI assistant) may take an action in response to the user's natural language expression. In some embodiments, the online system also performs other actions, such as using the determined intent as a soft intent label for the user expression, to be used to enlarge a training set for directly training an intent model without requiring costly human labeling of expressions with corresponding intents.

System Environment

Figure 1:
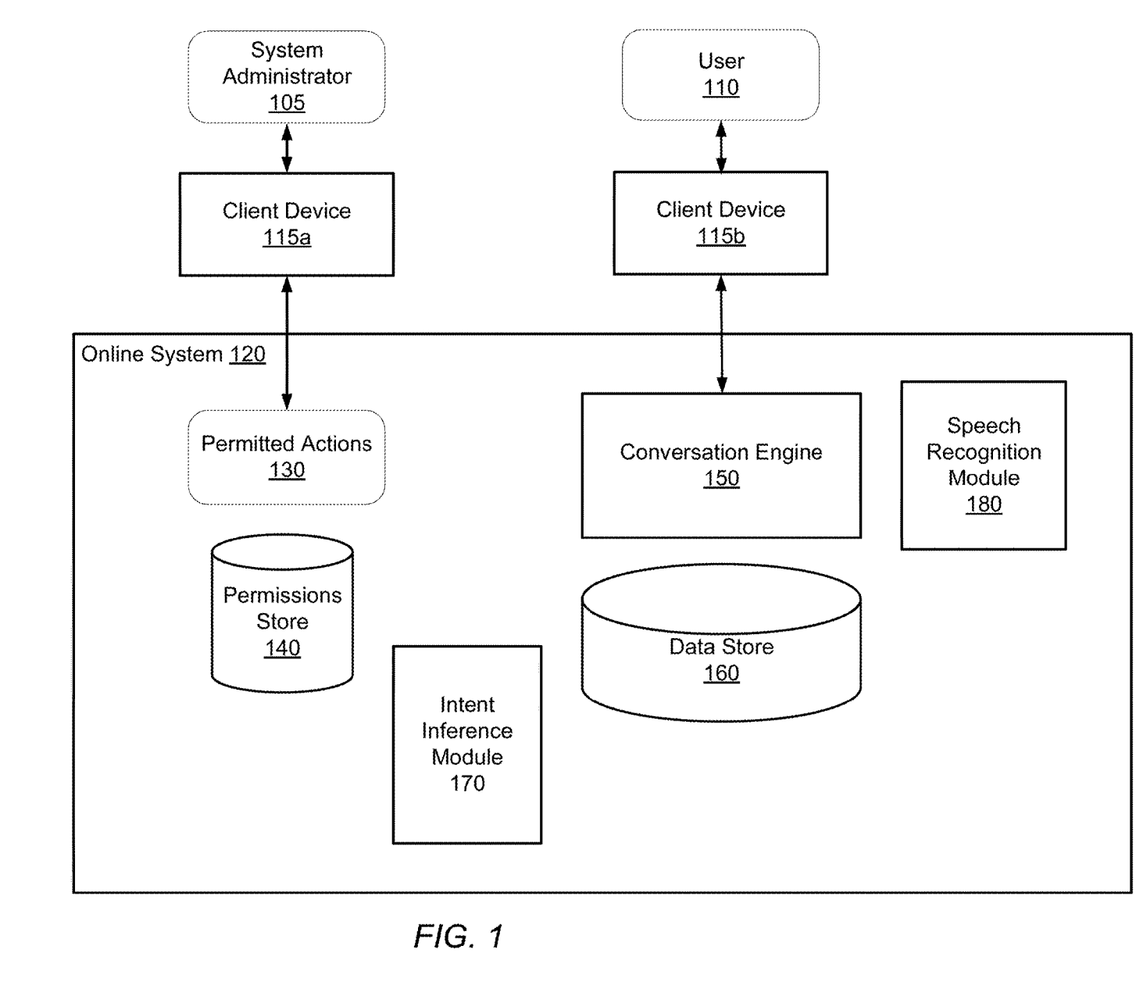
FIG. 1 is a block diagram of a system environment for performing actions according to requests made by users through natural language interactions with an online system, according to one embodiment.

FIG. 1 is a block diagram of a system environment 100 for performing actions according to requests made by users through natural language interactions with the online system, according to one embodiment. The system environment 100 includes an online system 120 that communicates with users via the users' client devices 115. Some users are privileged users, such as system administrators, who are allowed to perform specific actions that other users cannot. In some embodiments, the online system 120 includes a permissions store 140, a conversation engine 150, and a data store 160. The online system 120 may include other components not shown in FIG. 1, such as various applications, other types of data stores, and so on. The system environment 100 may include other elements not shown in FIG. 1, such as a network interconnecting the various components such as the online system 120 and the client devices 115.

In some embodiments, the online system 120 allows a system administrator 105 to specify permitted actions 130 that a user or sets of users are allowed to perform using the online system 120. For example, the online system 120 may allow the system administrator 105 to define roles for users and specify permitted actions 130 for each role. Metadata describing the permitted actions 130 for different roles or users is stored in permissions store 140. In an embodiment, the permissions store 140 includes one or more tables to store relations between roles and permitted actions, relations between users and roles, and optionally, relations between users and permitted actions. In some alternative embodiments, users are permitted to perform any action; in such embodiments, the permissions store 140 and list of permitted actions 130 are not required.

In such embodiments, once the permitted actions 130 for a user 110 are specified, the user 110 can perform natural language conversations with the online system 120 to perform the actions. The conversation engine 150 stores the instructions that allow the online system 120 to perform natural language conversations with users 110. The conversation engine 150 receives a natural language expression from a user and determines the permitted action 130 that the user requested via the natural language expression. The conversation engine 150 uses a machine learning-based model, such as a neural network, to determine a permitted action 130 corresponding to a natural language expression. The conversation engine 150 determines whether additional information is needed to perform the permitted action and performs further conversation with the user to receive the additional information. After collecting the required information, the online system performs the requested action. The components of a conversation engine 150 are further described in detail herein, e.g., with respect to FIG. 2.

In some embodiments, the online system 120 permits users 110 to interact with it via voice. In such embodiments, the online system 120 includes a speech recognition module 180 that receives an audio signal as input and converts it into a computer-readable format (such as text) for further processing. The output of the speech recognition module 180 is provided as input to other modules of the online system 150 that analyze natural language represented in the computer-readable form (e.g., textual form).

The online system 120 stores data in data store 160 that may be processed by a permitted action. For example, a permitted action may update data stored in data store 160, search for data stored in data store 160, and so on. The data store 160 stores data for users of the online system. In an embodiment, the data store 160 stores information describing entities represented in the online system. Each entity has an entity type, and each entity stores values in fields or data fields. Examples of entity types include account, case, opportunity, and so on. An entity representing an account stores information describing a user or an enterprise; an entity representing an opportunity represents a potential customer and stores fields representing information identifying the potential customer, a status of the opportunity, or the last interaction with the potential customer; an entity representing a case stores information describing an interaction between an enterprise and a customer and stores fields comprising the date of the interaction, the type of the interaction, and other details of the interaction.

The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc. In other embodiments, the data store is implemented in unstructured format, such as with a NoSQL database.

In some embodiments, the online system 120 stores data of multiple tenants to form a multi-tenant system. Each tenant may be an enterprise. For example, a tenant may be a company that employs sales people that use the online system 120 to manage their sales processes. A multi-tenant system may store data for multiple tenants in the same physical database but enforce a logical separation of data across tenants. As a result, one tenant does not have access to another tenant's data unless such data is expressly shared.

In some such embodiments, each tenant is able to define its own metadata. For example, two tenants may define different sets of entity types. Furthermore, for the same entity type, two tenants may store different sets of fields. Two tenants may also define different sets of actions for their entity types. For example, one tenant may allow users to update specific fields of an entity type but another tenant may not allow these updates. Accordingly, the conversation engine 150 may map a natural language expression from a user to different permitted actions for two different tenants. Furthermore, two tenants may store their data using different underlying data schemas. Accordingly, the same permitted action may execute different sets of instructions for two different tenants. Some embodiments use the same trained machine learning-based model across different tenants. Accordingly, the machine learning based model is not trained separately for each tenant but is trained once and executed across different tenants.

In an embodiment, online system 120 implements a web-based customer relationship management (CRM) system. For example, the online system 100 may include application servers configured to implement and execute CRM software applications as well as provide related data, code, forms, webpages and other information to and from client devices 110 and to store to, and retrieve from, a database system-related data, objects, and webpage content.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network 110 can be represented using technologies and/or formats including the hypertext markup language (HTML), the extensible markup language (XML), etc.

The online system 120 additionally stores an intent inference module 170 that employs natural language inference (NLI) techniques to allow reliable determination of a user's intent when the user uses a given expression. The intent inference module 170 is now described in additional detail with respect to FIG. 2.

System Architecture

Figure 2:
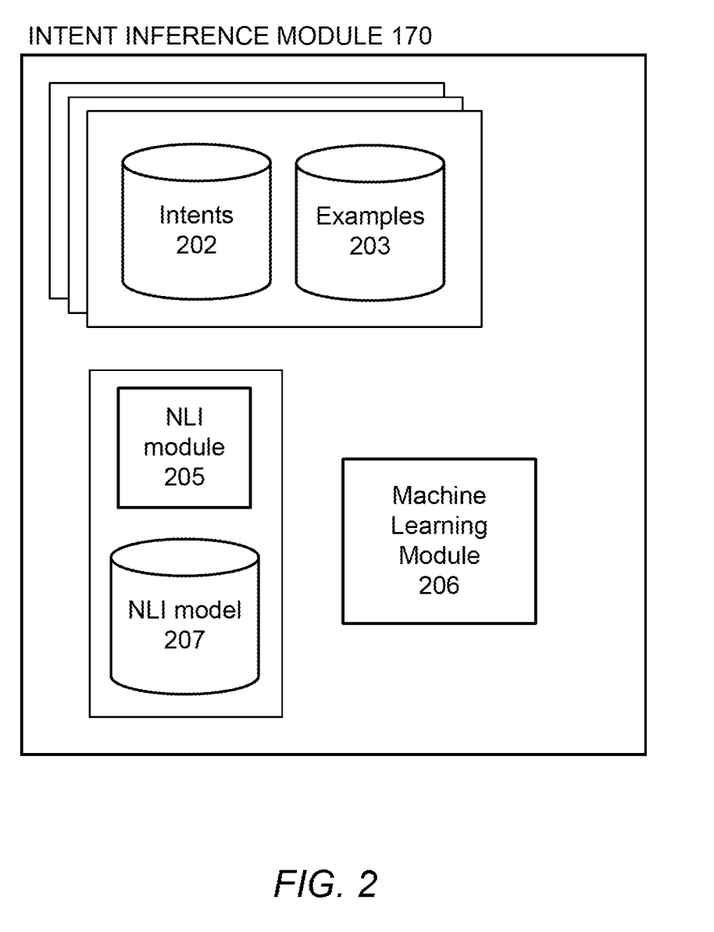
FIG. 2 is a high-level block diagram illustrating a detailed view of the intent inference module of FIG. 1, according to one embodiment.

FIG. 2 is a high-level block diagram illustrating a detailed view of the intent inference module 170 of FIG. 1, according to one embodiment.

The intent inference module 170 stores a set of intents 202 that represent the various possible actions that a user could intend by a given natural language expression. For instance, some example intents might express the user's desire to change the user's email address, to change the user's physical mailing address, to begin composition of an electronic message, or the like. The intents 202 can be represented in any manner (e.g., as an integer or string), as long as each intent's representation is distinct from the others.

The intent inference module 170 additionally stores, for each intent 202, a set of example natural language expressions. The examples 203 for an intent 202 are representative expressions in natural language form that are known to indicate that intent on the part of a user who uses those expressions. The examples may be stored in any suitable form, such as text (e.g., in YAML, files). In order to avoid the expense of being obliged to generate or otherwise obtain large amounts of sample data (e.g., thousands or tens of thousands of examples), there need be only a small number of examples 203 for each intent, with natural language inference leveraged as described later to obtain reliability without the benefit of many examples. For example, in some embodiments the intent inference module 170 stores only approximately 5 examples for each intent, an amount of examples that is easily feasible for a data scientist or other knowledgeable user to provide directly. For instance, the examples for the intent expressing the desire to change the user's email address might be {"I want to update my email address", "I need to change my email address", "Update email address", "Please change my email address", "Update my email"}. In some embodiments, all instances 202 have the same number of corresponding examples 203 (e.g., 5 examples); in other embodiments, there number of examples may differ between different intents.

In embodiments in which the online system 120 stores the data of multiple tenants, each tenant may have its own set of intents 202 and examples 203 that are specific to it, thus allowing natural language understanding that is tailored for the domain in which the tenant is operating.

The intent inference module 170 includes an NLI module 205 that determines which of the various possible intents 202, if any, is most applicable for a given natural language expression of a user. To do so, the NLI module 205 uses an NLI model 207 that determines, for a given first natural language expression and a given second natural language expression, a score indicating a likelihood that the first natural language expression textually entails the second natural language expression. (A first natural language expression is said to textually entail a second natural language expression—or, equivalently, the second natural language expression is said to be inferable from the first natural language expression—if a human reading the first expression would consider that the second expression to is most likely true. For example, the expression "I would like to change my email address" textually entails the expression "Change user information", because a human would likely conclude that the second expression is indeed being requested in light of the first expression.)

Given a user expression, the NLI module 205 scores the examples of the various known <intent, example> pairs from the stored intents 202 and examples 203 in order to determine which intent is most applicable to the user expression. That is, for each intent $N_i$ 202 (or some subset thereof), and for each example $E_j$ (or some subset thereof), and for a user expression Q, the NLI module 205 provides Q and $E_j$ as input to the NLI model 207 to obtain a score indicating a likelihood that Q textually entails $E_j$.

The most applicable intent $N_i$ is determined based on the various scores produced for the various <Q, $E_j$> pairs. In one embodiment, the NLI module 205 identifies the example $E_j$ that is most strongly textually entailed by Q (that is, the $E_j$ corresponding to the greatest of the textual entailment scores) and assigns its score to its corresponding intent Ni, and if its score is above a given threshold indicating a sufficient level of confidence, then the NLI module determines that the intent $N_i$ corresponding to the example $E_j$ is representative of the expression Q. In other embodiments, the NLI module 205 computes an aggregate score for a given intent $N_i$ based on the scores for the <Q, $E_j$> pairs for all the examples $E_j$ corresponding to that intent, and selects the intent with the highest score, provided that that score is over a given confidence threshold. In some such embodiments, the aggregate score for an intent is an arithmetic average for all the examples for the intent.

In some embodiments, the NLI module 205 associates only the most applicable intent (i.e., the intent with the highest entailment score) with the user expression. In other embodiments, the NLI module 205 may associate multiple intents with the user expression, such as up to some predetermined number of top intents with scores of at least some threshold level.

For some user expressions, the process above may find no intent 202 to be applicable. Thus, in some embodiments, the process is tried again in reverse order, with the NLI module 205 scoring the various <$E_j$, Q> pairs. That is, rather than determining how strongly Q textual entails $E_j$, the NLI module 205 instead determines how strongly $E_j$ textually entails Q. Then, the intent $N_i$ with the highest corresponding score—where the score for an intent may be determined by the same techniques as descried above, such as the intent corresponding to the single highest <$E_j$, Q> score, or the intent with the highest aggregate scores of all of its <$E_j$, Q> scores—is selected as the most applicable intent, provided that its score is greater than some threshold score indicating sufficient confidence for the "reverse order" (e.g., a threshold of 0.5, corresponding to binary "yes"/"no" classification). In some embodiments, the NLI module 205 may select multiple intents for the user observation based on the "reverse order" scores.

In some embodiments, the intent inference module 170 includes a machine learning module 206 that trains the NLI model 207 used by the NLI module 205. The input to the training is a set of ordered natural language expression pairs, along with a label for each pair indicting whether the first expression of the pair does or does not textually entail the second expression of the pair. Such pairs and corresponding labels may be obtained from corpuses such as SNLI, MNLI, or WNLI, with the appropriate preprocessing (e.g., converting corpus labels indicating entailment to a binary "true" value and labels indicating contradiction, or neither entailment nor contraction, to binary "false" values). Techniques such as BERT (Bidirectional Encoder Representations from Transformers) may be used to train the NLI model 207 given the input pairs and labels.

In some such embodiments, the machine learning module 206 also trains other types of models. For example, the intent inference module 170 may use the machine learning module 206 to train an intent classification model that directly predicts the user's intent for a given natural language expression. Specifically, the intents determined to apply to a given natural language expression using the NLI module 205 as described above are treated as "soft" labels for the expression. The set of all such expressions with intent labels produced by the NLI module 205 then serves as input to the machine learning module 206, which uses a supervised learning algorithm to generate an intent classification model that directly predicts user intent.

Applications

The online system 120 can use the intents determined by the NLI module 205 for natural language expressions for various purposes.

As one example, as noted above, embodiments in which the intent inference module 170 includes a machine learning module 206 can use the machine learning module to train an intent model, using the intents determined by the NLI module 205 as "soft" labels. The use of these "soft" labels avoids the considerable time and expense in obtaining labels manually applied by human experts in the quantity required to train an intent model.

As another example, embodiments in which the online system has a conversation engine 150 can use the intents determined by the NLI module 205 to guide a conversation with a user. For example, if the user specifies (e.g., by voice, or by text in a query or chat session, or the like) the natural language expression "Change my email address for me", the NLI module 205 can determine that the intent to change the user's email address on the online system 120 is the most applicable intent, and the conversation engine 150 can accordingly take a next step in the conversation, such as prompting the user for a new email address to substitute for the existing one, presenting a user interface showing the current email address and allowing the user to enter a new email address, or the like.

Figure 3:
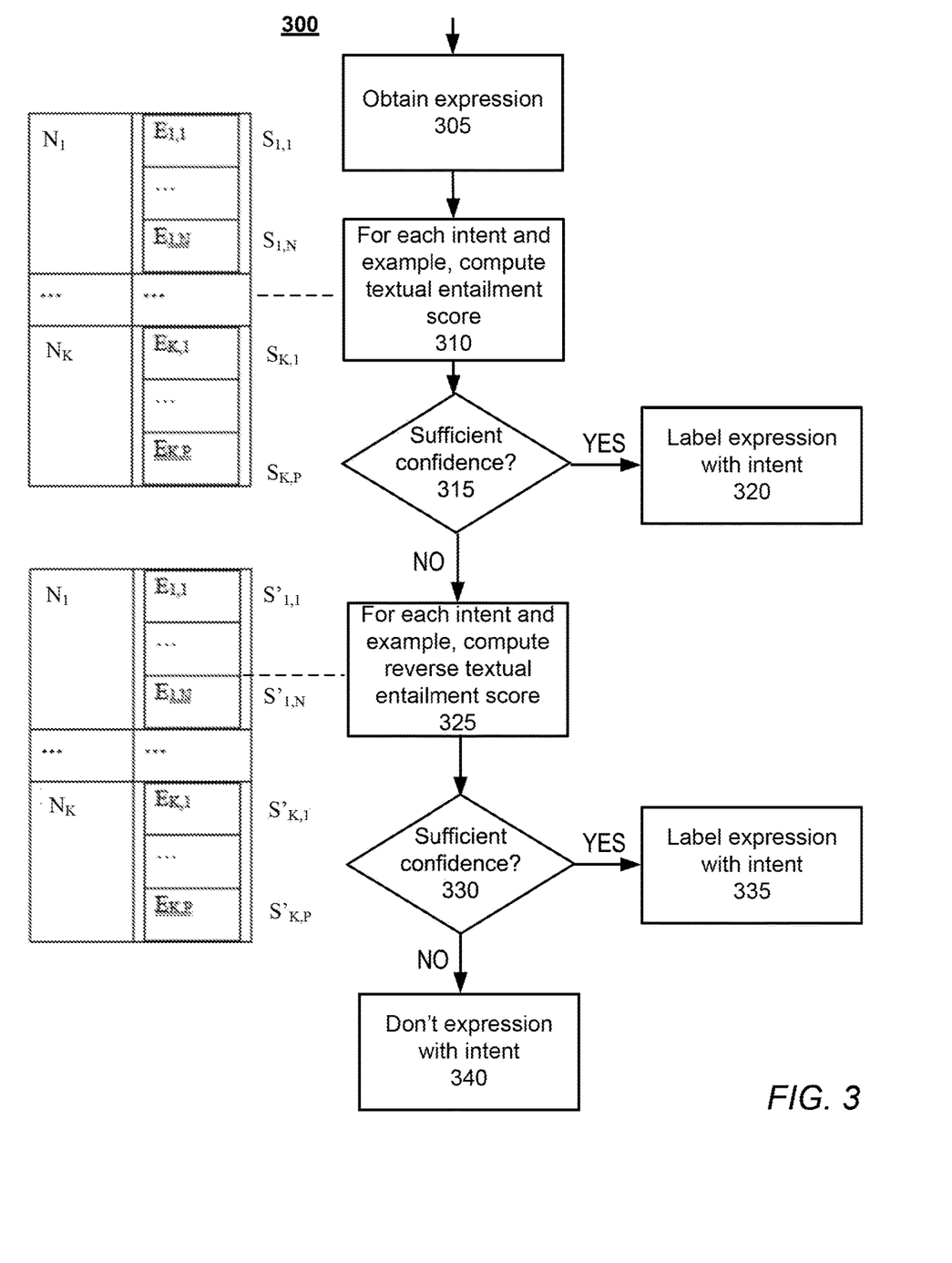
FIG. 3 is a flowchart illustrating the steps undertaken by an NLI module of the intent inference module of FIG. 2 when determining an intent for a natural language expression, according to some embodiments.

FIG. 3 is a flowchart illustrating the steps undertaken by the NLI module 205 when determining an intent for a natural language expression, according to some embodiments. The NLI module 205 obtains 305 a natural language expression Q, such as "Change my email address for me." For each intent $N_i$ 202, and for each example $E_j$ 203 for that intent, the NLI module 205 computes 310 a textual entailment score indicating whether Q textually entails $E_j$. The NLI module 205 computes an entailment score for each stored intent 202 as discussed above, and if the greatest entailment score indicates 315 sufficient confidence for the corresponding intent, the NLI module 205 labels 320 the expression Q as representing that intent.

If the confidence is not sufficient, then for each intent $N_i$ 202, and for each example $E_j$ 203 for that intent, the NLI module 205 computes 325 a textual entailment score indicating whether $E_j$ textually entails Q. If the greatest computed entailment score indicates 330 sufficient confidence, then the NLI module 205 labels 335 the expression Q as representing that intent. Otherwise, no intent is assigned to the expression Q.

Figure 4:
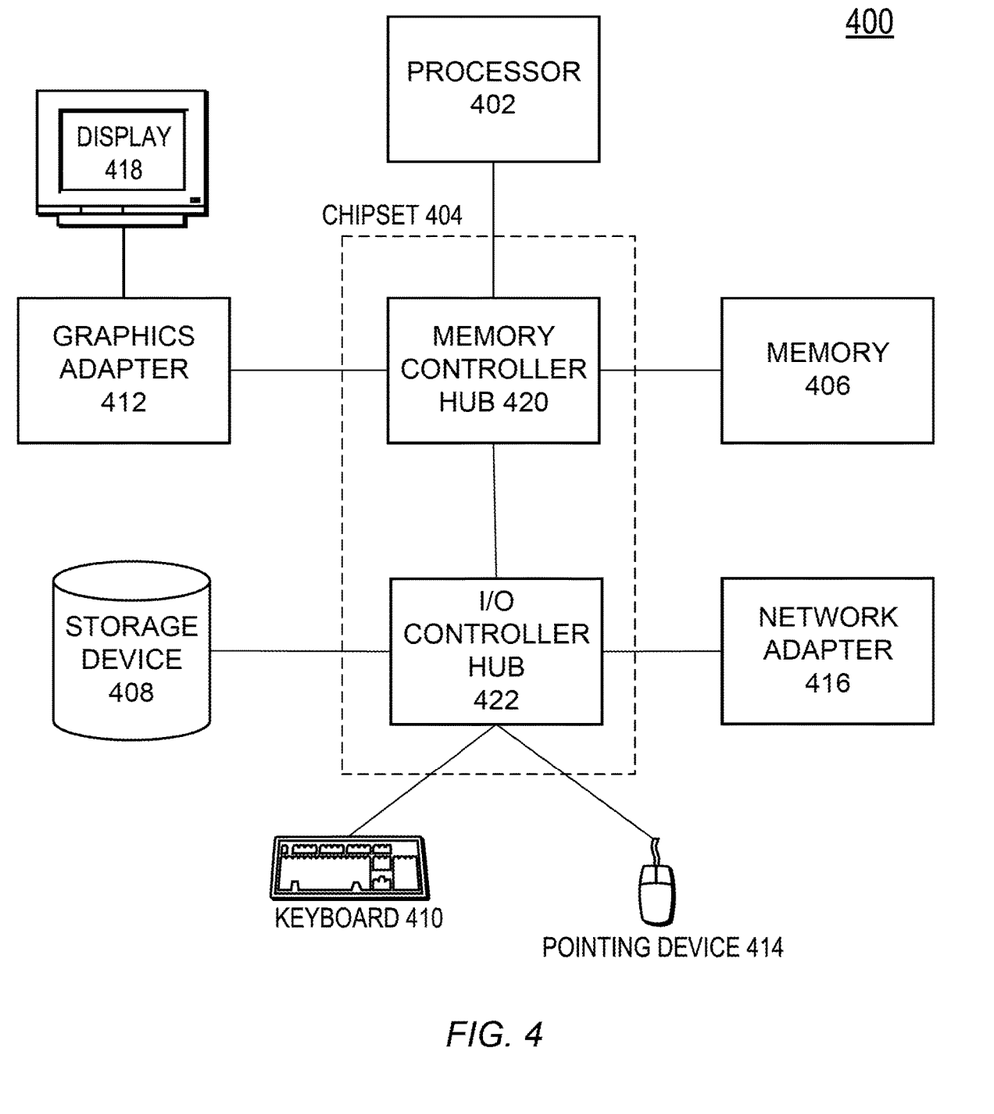
FIG. 4 is a high-level block diagram illustrating physical components of a computer used as part or all of the online system or the client devices from FIG. 1, according to one embodiment.

FIG. 4 is a high-level block diagram illustrating physical components of a computer 400 used as part or all of the online system 120 or the client devices 115 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method for determining user intent for a user natural language expression through natural language inference, the computer-implemented method comprising:
   obtaining, from a user, a user expression in natural language form;
   for each intent of a plurality of stored possible intents, and for each of an associated plurality of stored example expressions for the intent:
      providing the user expression and the example expression as input to a natural language inference model, and
      obtaining from the natural language inference model a score indicating whether the user expression textually entails the example expression;
   selecting a most applicable intent from the plurality of stored possible intents based on the obtained scores; and
   comparing a score of the selected most applicable intent to a confidence threshold to determine whether the intent is representative of the user expression.

2. The computer-implemented method of claim 1, further comprising:
   determining that the selected most applicable intent is representative of the user expression; and
   responding to the user expression based on the selected most applicable intent.

3. The computer-implemented method of claim 1, further comprising:
   determining that the selected most applicable intent is representative of the user expression;
   labeling the user expression with the selected most applicable intent; and
   training an intent classification model by providing the labeled user expression and other labeled natural language expressions to a supervised learning algorithm.

4. The computer-implemented method of claim 3, further comprising:
   receiving from a user a natural language expression lacking an intent label; and
   providing the received natural language expression as input to the intent classification model; and
   identifying, as output of the intent classification model, a user intent represented by the received natural language expression.

5. The computer-implemented method of claim 1, further comprising:
   responsive to determining that the selected most applicable intent is not representative of the user expression:
      for each intent of the plurality of stored possible intents, and for each example expression of the pluralities of stored example expressions for the possible intents:
         providing the example expression and the user expression and as input to the natural language inference model, and
         obtaining from the natural language inference model a second score indicating whether the example expression the textually entails the user expression;
      selecting a most applicable intent from the plurality of stored possible intents based on the obtained second scores; and
      comparing a score of the selected most applicable intent to a second confidence threshold to determine whether the selected most applicable intent is representative of the user expression.

6. The computer-implemented method of claim 1, wherein selecting a most applicable intent from the plurality of stored possible intents based on the obtained scores comprises:
   selecting the intent having the stored example expression with the highest score.

7. The computer-implemented method of claim 1, wherein selecting a most applicable intent from the plurality of stored possible intents based on the obtained scores comprises:
   computing, for each intent of the stored possible intents, an aggregate score based on the scores of the stored example expressions for the intent; and
   selecting the intent having the highest aggregate score.

8. The computer-implemented method of claim 1, wherein the method is performed by a multi-tenant system with a plurality of tenants, where different tenants have different pluralities of stored possible intents, different example expressions corresponding to the possible intents, and/or different natural language inference models.

9. The computer-implemented method of claim 1, wherein the pluralities of stored example expressions for the possible intents comprise at most 20 examples.

10. A non-transitory computer-readable storage medium storing instructions that when executed by a computer processor perform actions comprising:
   obtaining, from a user, a user expression in natural language form;
   for each intent of a plurality of stored possible intents, and for each of an associated plurality of stored example expressions for the intent:
      providing the user expression and the example expression as input to a natural language inference model, and
      obtaining from the natural language inference model a score indicating whether the user expression textually entails the example expression;
   selecting a most applicable intent from the plurality of stored possible intents based on the obtained scores; and
   comparing a score of the selected most applicable intent to a confidence threshold to determine whether the intent is representative of the user expression.

11. The non-transitory computer-readable storage medium of claim 10, the instructions further comprising:
   determining that the selected most applicable intent is representative of the user expression; and
   responding to the user expression based on the selected most applicable intent.

12. The non-transitory computer-readable storage medium of claim 10, the actions further comprising:
   determining that the selected most applicable intent is representative of the user expression;
   labeling the user expression with the selected most applicable intent; and
   training an intent classification model by providing the labeled user expression and other labeled natural language expressions to a supervised learning algorithm.

13. The non-transitory computer-readable storage medium of claim 12, the actions further comprising:
   receiving from a user a natural language expression lacking an intent label; and
   providing the received natural language expression as input to the intent classification model; and
   identifying, as output of the intent classification model, a user intent represented by the received natural language expression.

14. The non-transitory computer-readable storage medium of claim 10, the actions further comprising:
   responsive to determining that the selected most applicable intent is not representative of the user expression:
      for each intent of the plurality of stored possible intents, and for each example expression of the pluralities of stored example expressions for the possible intents:
         providing the example expression and the user expression and as input to the natural language inference model, and
         obtaining from the natural language inference model a second score indicating whether the example expression the textually entails the user expression;
      selecting a most applicable intent from the plurality of stored possible intents based on the obtained second scores; and
      comparing a score of the selected most applicable intent to a second confidence threshold to determine whether the selected most applicable intent is representative of the user expression.

15. The non-transitory computer-readable storage medium of claim 10, wherein selecting a most applicable intent from the plurality of stored possible intents based on the obtained scores comprises:
   selecting the intent having the stored example expression with the highest score.

16. The non-transitory computer-readable storage medium of claim 10, wherein selecting a most applicable intent from the plurality of stored possible intents based on the obtained scores comprises:
   computing, for each intent of the stored possible intents, an aggregate score based on the scores of the stored example expressions for the intent; and
   selecting the intent having the highest aggregate score.

17. An online system comprising:
   a computer processor; and
   a non-transitory computer-readable storage medium storing instructions that when executed by the computer processor perform actions comprising:
      obtaining, from a user, a user expression in natural language form;
      for each intent of a plurality of stored possible intents, and for each of an associated plurality of stored example expressions for the intent:
         providing the user expression and the example expression as input to a natural language inference model, and
         obtaining from the natural language inference model a score indicating whether the user expression textually entails the example expression;
      selecting a most applicable intent from the plurality of stored possible intents based on the obtained scores; and
      comparing a score of the selected most applicable intent to a confidence threshold to determine whether the intent is representative of the user expression.

18. The online system of claim 17, the actions further comprising:
   responsive to determining that the selected most applicable intent is not representative of the user expression:
      for each intent of the plurality of stored possible intents, and for each example expression of the pluralities of stored example expressions for the possible intents:
         providing the example expression and the user expression and as input to the natural language inference model, and
         obtaining from the natural language inference model a second score indicating whether the example expression the textually entails the user expression;
      selecting a most applicable intent from the plurality of stored possible intents based on the obtained second scores; and
      comparing a score of the selected most applicable intent to a second confidence threshold to determine whether the selected most applicable intent is representative of the user expression.

19. The online system of claim 17, wherein selecting a most applicable intent from the plurality of stored possible intents based on the obtained scores comprises:

selecting the intent having the stored example expression with the highest score.

\* \* \* \* \*